(12) United States Patent
Hayashi

(10) Patent No.: US 8,608,603 B2
(45) Date of Patent: Dec. 17, 2013

(54) BELT DRIVE SYSTEM

(75) Inventor: Takehiro Hayashi, Kobe (JP)

(73) Assignee: Bando Chemical Industries, Ltd., Kobe-Shi, Hyogo (JP)

(*) Notice: Subject to any disclaimer, the term of this patent is extended or adjusted under 35 U.S.C. 154(b) by 679 days.

(21) Appl. No.: 11/909,143

(22) PCT Filed: Mar. 22, 2006

(86) PCT No.: PCT/JP2006/305696
§ 371 (c)(1),
(2), (4) Date: Sep. 19, 2007

(87) PCT Pub. No.: WO2006/101121
PCT Pub. Date: Sep. 28, 2006

(65) Prior Publication Data
US 2009/0062050 A1 Mar. 5, 2009

(30) Foreign Application Priority Data
Mar. 22, 2005 (JP) .................. 2005-081613

(51) Int. Cl.
*F16H 7/02* (2006.01)
*F16H 7/04* (2006.01)
*F16H 55/36* (2006.01)
*F16G 1/00* (2006.01)
*F16G 5/00* (2006.01)
*F16G 9/00* (2006.01)

(52) U.S. Cl.
USPC .................. 474/167; 474/237; 474/166

(58) Field of Classification Search
USPC ......... 474/17, 20, 21, 91, 260, 268, 205, 204, 474/263, 237
See application file for complete search history.

(56) References Cited

U.S. PATENT DOCUMENTS 4,031,768 A * 6/1977 Henderson et al. ........... 474/250
5,250,010 A * 10/1993 Mishima et al. .............. 474/263
(Continued)

FOREIGN PATENT DOCUMENTS

JP 6-20936 U 3/1994
JP 10-80957 A 3/1998
(Continued)

OTHER PUBLICATIONS

International Search Report for PCT/JP2006/305696 mailed Apr. 25, 2006.

*Primary Examiner* — William A Rivera
*Assistant Examiner* — Henry Liu
(74) *Attorney, Agent, or Firm* — Roberts Mlotkowski Safran & Cole, P.C.

(57) ABSTRACT

[Purpose] A belt drive system, in which a drive belt 20 is wrapped between a drive pulley 1 drivingly connected to a drive source 11 and a driven pulley 2 connected to an driven unit 12 via a joint 32 provided to stop torque transmission when receiving a load equal to or over a predetermined value and torque is transmitted via the drive belt 20 from the drive pulley 1 to the driven pulley 2, ensures that when the driven unit 12 malfunctions, the joint 32 stops the torque transmission without unnecessarily increasing the coefficient of friction against the driven pulley 2 or the belt tension.
[Solution] The belt drive system is configured so that when a slip corresponding to the load on the joint 32 equal to or over the predetermined value occurs between the drive belt 20 and the driven pulley 2, the coefficient of friction between the drive belt 20 and the driven pulley 2 becomes higher than that before the slip occurs.

5 Claims, 2 Drawing Sheets

(56) References Cited

U.S. PATENT DOCUMENTS

| | | | |
|---|---|---|---|
| 5,254,050 A * | 10/1993 | Nakajima et al. | 474/260 |
| 5,284,456 A * | 2/1994 | Connell et al. | 474/91 |
| 6,110,061 A * | 8/2000 | Kishibuchi et al. | 474/17 |
| 6,491,598 B1 * | 12/2002 | Rosenboom | 474/260 |
| 6,669,591 B1 * | 12/2003 | Brinkman et al. | 474/264 |
| 6,855,082 B2 * | 2/2005 | Moncrief et al. | 474/263 |
| 2005/0037882 A1 * | 2/2005 | Hineno et al. | 474/263 |

FOREIGN PATENT DOCUMENTS

| | | | | |
|---|---|---|---|---|
| JP | 2000-356226 A | | 12/2000 | |
| JP | 2000356226 A | * | 12/2000 | F16D 7/02 |
| JP | 2003-13743 A | | 1/2003 | |
| JP | 2003013743 A | * | 1/2003 | F02B 77/08 |
| JP | 2003-202055 A | | 7/2003 | |
| JP | 2005-15769 A | | 1/2005 | |
| JP | 2005015769 A | * | 1/2005 | C08L 21/00 |
| JP | 2005-61593 A | | 3/2005 | |

* cited by examiner

BELT DRIVE SYSTEM

TECHNICAL FIELD

This invention relates to belt drive systems in which, in transmitting torque via a single drive belt to a plurality of driven units, torque transmission to a disabled driven unit is stopped and torque transmission to the other driven units is thereby maintained, and particularly relates to measures for ensuring the stop of torque transmission to the disabled driven unit.

BACKGROUND ART

For example, serpentine belt accessory drive systems for vehicle engines are each configured to transmit torque to a plurality of accessories to drive them by wrapping a single drive belt around a crank pulley of the engine and driven pulleys for the accessories.

In such a case, if one of the accessories is disabled and goes down, the brake will be applied to the rotation of the driven pulley for the disabled accessory. However, the drive belt does not stop frictional engagement with the driven pulley. This impedes the traveling of the drive belt, which may inhibit appropriate torque transmission to the other accessories or may break the drive belt.

Patent Document 1 discloses, as a solution to the above problem, a belt drive system in which a torque limiter is disposed in a torque transmission path between an input shaft for a variable displacement compressor serving as an accessory and a driven pulley coaxially disposed on the input shaft to allow frictional engagement between an input member connected to the driven pulley for unitary rotation and an output member connected to the input shaft for unitary rotation. According to this technique, when the compressor locks and the load reaches a torque limit, the torque limiter operates to release the frictional engagement between the input and output members to stop torque transmission from the driven pulley to the input shaft.

Patent Document 1: Published Japanese Patent Application No. 2000-356226 (Page 3 and FIG. 1)

DISCLOSURE OF THE INVENTION

Problems to be Solved by the Invention

In order to surely activate the torque limiter in the above-described belt drive system, it is necessary that the capacity for the drive belt to transmit power to the driven pulley should be over the torque limit of the torque limiter.

Theoretically, the torque limit of the torque limiter is sufficient if it is set at a slightly larger value than the torque required to drive the associated driven unit. However, considering that the torque limiter malfunctions owing to variations in the required torque resulting from its degradation or influences of inertial torque of the driven pulley during acceleration or deceleration of the engine, it is necessary that the torque limit be set to be 1.5 or more times larger than the torque required to drive the driven unit.

Furthermore, the power transmission capacity of the drive belt depends upon the coefficient of friction with the driven pulley and the belt tension and, therefore, can be enhanced by increasing the coefficient of friction between them or increasing the belt tension.

However, if the coefficient of friction is increased, another problem arises that abnormal sound is produced. On the other hand, if the belt tension is increased, still another problem arises that not only the lifetime of the bearing for the pulley is shortened but also the power transmission loss is increased.

The present invention has been made in view of the foregoing points and, therefore, its principal object is to provide a belt drive system in which, in transmitting toque from a drive source via a single drive belt to driven pulleys for a plurality of driven units, a joint undergoing an overload operates to stop torque transmission from the associated driven pulley to the driven unit and which ensures that the joint for the disabled driven unit operates to stop torque transmission without unnecessarily increasing the coefficient of friction between the drive belt and the driven pulley or the tension of the drive belt.

Means to Solve the Problems

To attain the above object, the present invention focuses on the fact that upon malfunction of a driven unit, a large slip occurs between the driven pulley for the driven unit and the drive belt, and uses such a large slip to transfer the rubber on the surface of the drive belt onto the surface of the driven pulley, thereby increasing the coefficient of friction between the drive belt and the driven pulley and in turn ensuring that the joint between the driven pulley and the driven unit operates to stop torque transmission.

Specifically, a belt drive system according to an aspect of the present invention comprises: a drive source for generating torque; a drive pulley, drivingly connected to the drive source, for outputting the torque of the drive source; at least one driven unit for performing a specified action upon input of the torque; a driven pulley, connected to the driven unit, for inputting the torque to the driven unit; a drive belt, wrapped between the drive pulley and the driven pulley, for transmitting the torque of the drive pulley to the driven pulley by frictional engagement with the drive pulley and the driven pulley; and a joint, interposed between the driven pulley and the driven unit to transmit the torque of the driven pulley to the driven unit, for stopping the torque transmission when receiving a load equal to or over a predetermined value, and is configured so that when a slip corresponding to the load on the joint equal to or over the predetermined value occurs between the drive belt and the driven pulley, the coefficient of friction between the drive belt and the driven pulley becomes higher than that before the slip occurs.

In this configuration, an example of a means for increasing the coefficient of friction includes providing a belt material forming the contact surface of the drive belt with the driven pulley to partly transfer to the driven pulley using the slip caused between the drive belt and the driven pulley. Furthermore, specific values of the coefficients of friction before and after the slip, for example, are set as follows: the coefficient of friction between the drive belt and the driven pulley when the load on the joint is below the predetermined value is 1.4 or smaller and the coefficient of friction when the load on the joint is equal to or over the predetermined value is 1.8 or larger.

Furthermore, when the belt material of the drive belt is a rubber material, the main rubber ingredient of the rubber material may be EPDM (ethylene propylene rubber), or CSM (chlorosulfonated polyethylene rubber) (especially ACSM (alkylated chlorosulfonated polyethylene rubber)). In such a case, the rubber material preferably contains 10 to 20 vol % carbon or 6 vol % aliphatic polyamide fibers (nylon fibers).

Furthermore, the belt drive system having the above configuration can be used as a belt accessory drive system for a motor vehicle engine including a motor vehicle engine serving as the drive source and an engine accessory serving as the driven unit.

Effects of the Invention

According to the belt drive system of the present invention in which torque from the drive pulley for the drive source is transmitted via the drive belt to the driven pulley for the driven unit and torque of the driven pulley is transmitted to the driven unit via the joint for stopping the torque transmission when receiving an overload, when a slip corresponding to an overload of the joint occurs between the drive belt and the driven pulley, the coefficient of friction between the drive belt and the driven pulley becomes high, which ensures that the joint operates to stop the torque transmission without previously unnecessarily increasing the coefficient of friction between the drive belt and the driven pulley or the belt tension. As a result, when one of the driven units malfunctions, torque transmission to the other driven units can be maintained without incurring production of abnormal sound due to excessively high coefficient of friction between the drive belt and the driven pulley or increase in transmission loss due to excessively high belt tension.

Figure 1:
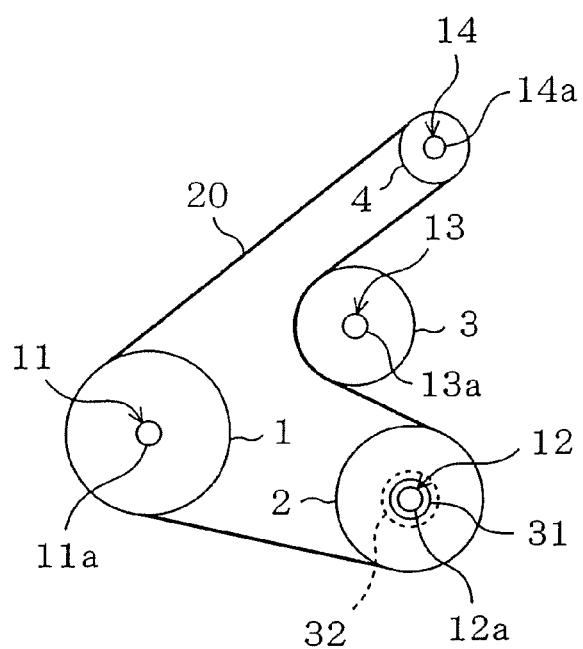
FIG. 1 is a front view schematically showing the overall structure of a belt accessory drive system for a vehicle engine according to an embodiment of the present invention.

EXPLANATION OF REFERENCE NUMERALS 1 crank pulley (drive pulley)
2 compressor pulley (driven pulley)
11 engine
12 compressor (for air conditioner) (accessory)
12a input shaft
20 V-ribbed belt (drive belt)
32 joint

BEST MODE FOR CARRYING OUT THE INVENTION

FIG. 1 schematically shows the overall structure of a belt accessory drive system for a vehicle engine according to an embodiment of the present invention. The structure of the accessory drive system is called a serpentine layout in which a single V-ribbed belt 20 serving as a drive belt is wrapped in a serpentine form around a crank pulley 1 serving as a drive pulley, a compressor pulley 2 for an air conditioner, a water pump pulley 3 and an alternator pulley 4.

Specifically, the crank pulley 1 is connected to a crank shaft 11a of an engine 11 for unitary rotation. The compressor pulley 2 is mounted coaxially on an input shaft 12a of a compressor 12. The water pump pulley 3 is connected to an input shaft 13a of a water pump 13 for unitary rotation. The alternator pulley 4 is connected to an input shaft 14a of an alternator 14 for unitary rotation. The crank pulley 1, the compressor pulley 2 and the alternator pulley 4 are V-ribbed pulleys having a plurality of circumferentially running V-grooves formed in the outer periphery of the rim to axially align at a specified pitch. The water pump pulley 3 is a flat pulley whose rim has a flat outer periphery. The V-ribbed belt 20 is wrapped around the crank pulley 1, the compressor pulley 2 and the alternator pulley 4 with the belt bottom face in contact therewith and wrapped around the water pump pulley 3 with the belt back face in contact therewith.

A bearing 31 is interposed between the compressor pulley 2 and the input shaft 12a of the compressor 12, whereby the compressor pulley 2 and the input shaft 12a can relatively rotate about the same axis. In addition, the compressor pulley 2 and the input shaft 12a are connected to each other to unitarily rotate via a joint 32 that breaks itself when receiving a predetermined torque limit. Thus, toque input to the compressor pulley 2 by frictional engagement with the V-ribbed belt 20 is transmitted via the joint 32 to the input shaft 12a, whereby the compressor 12 is driven. On the other hand, when the torque applied to the joint 32 increases to reach the toque limit, such as when the compressor 12 malfunctions to disable the rotation of the input shaft 12a, the joint 32 breaks itself to break the connection between the compressor pulley 2 and the input shaft 12a and thereby stop torque transmission between them.

Figure 2:
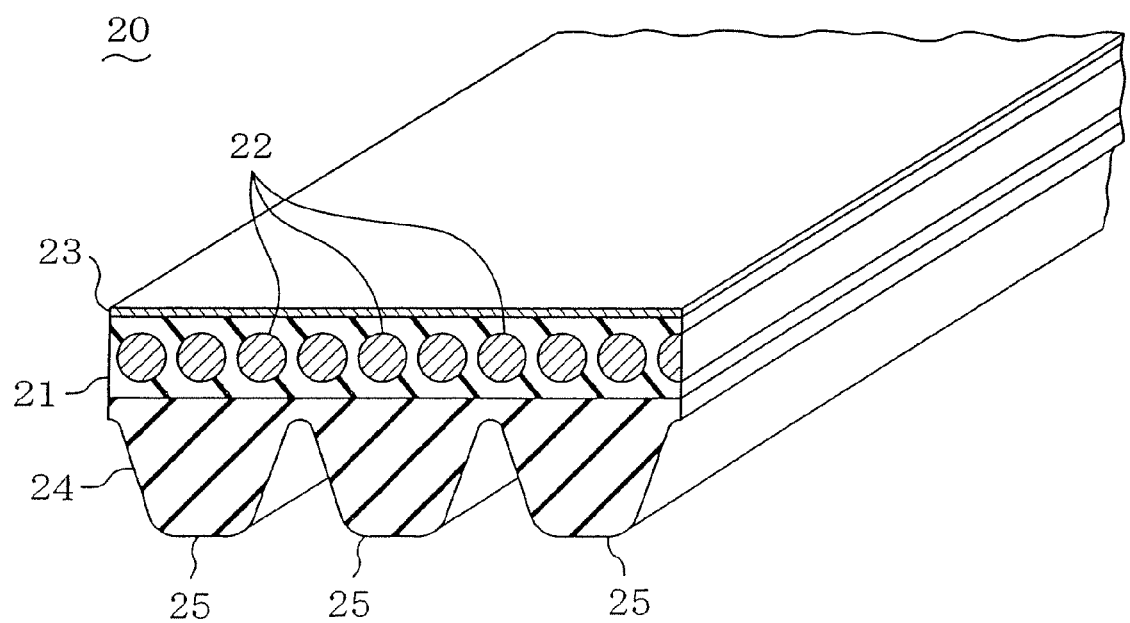
FIG. 2 is an enlarged perspective view schematically showing the overall structure of a V-ribbed belt of the belt accessory drive system with the V-ribbed belt sectioned in the belt widthwise direction.

As shown in enlarged form in FIG. 2, the V-ribbed belt 20 includes an adhesion rubber layer 21 of rectangular cross section and a cord 22 made of PET is embedded in the adhesion rubber layer 21 and spirally disposed therein to align in the belt widthwise direction at a specified pitch of turns. A top fabric layer 23 is laid on the belt back-side face (top face in the figure) of the adhesion rubber layer 21. On the other hand, a rib rubber layer 24 is laid on the belt bottom-side face (bottom face in the figure) of the adhesion rubber layer 21. The belt bottom-side face of the rib rubber layer 24 has a plurality of (three in the figure) ribs 25, 25, . . . formed thereon to extend in the belt lengthwise direction and align in the belt widthwise direction at a specified pitch. The surface of the rib rubber layer 24 provides a contact surface for frictionally engaging the crank pulley 1, the compressor pulley 2 and the alternator pulley 4.

Furthermore, in this embodiment, the belt drive system is configured so that when a slip equal to or over a predetermined magnitude, i.e., a slip corresponding to a load on the joint 32 equal to or over a predetermined value, occurs between the V-ribbed belt 20 and the compressor pulley 2, the belt material of the V-ribbed belt 20 forming the contact surface with the compressor pulley 2 partly transfers to the compressor pulley 2 together with the slip and the coefficient of friction μ' between the V-ribbed belt 20 and the compressor pulley 2 thereby becomes higher than that before the slip occurs.

Specifically, the V-ribbed belt 20 is configured so that the coefficient of friction μ' between the V-ribbed belt 20 and the compressor pulley 2 when the load on the joint 32 is below the torque limit and the slip occurring between them is below the predetermined magnitude is 1.4 or smaller (μ'≤1.4) and the coefficient of friction μ' between the V-ribbed belt 20 and the compressor pulley 2 when the load on the joint 32 is over the torque limit and the slip occurring between them is equal to or over the predetermined magnitude is 1.8 or larger (μ'≥1.8). To be more specific, out of all elements forming the V-ribbed belt 20, the main rubber ingredient of a rubber material constituting at least the belt material of the rib rubber layer 23 is EPDM. The rubber material further contains 10 to 20 vol % carbon and 6 vol % aliphatic polyamide fibers.

—Test—

A description is given here of a test carried out for seven types of V-ribbed belts, Examples 1 to 7, produced using different belt materials of different compositions in order to determine whether or not the joint breaks upon locking of rotation of the compressor input shaft. The V-ribbed belts used had a geometry of six ribs and 1200 mm belt pitch length.

For belt materials of Examples 1 to 7, EPT 3070 and CB FEF were used as EPDM and carbon, respectively. The other ingredients used for the belt materials were Sunpar 2280 (trade name) manufactured by Japan Sun Oil Co., Ltd., stearic acid, zinc oxide, Hi-Cross M (trade name) manufactured by Seiko Chemical Co., Ltd., Percumyl D (trade name) manufactured by NOF Corporation, Seimi OT (trade name) manufactured by Nippon Kanryu Industry Co., Ltd., EM-2 (trade name) manufactured by Sanshin Chemical Industry Co., Ltd., and MSA (trade name) manufactured by Ouchi Shinko Chemical Industrial Co., Ltd. In addition, nylon fibers (aliphatic polyamide fibers), cotton and Hi-Zex Million (trade name), high-molecular polyethylene manufactured by Mitsui Chemicals, Inc., were used. The compositions of the belt materials of these V-ribbed belts are as shown in the following table.

TABLE 1

|  | Ex. 1 | Ex. 2 | Ex. 3 | Ex. 4 | Ex. 5 | Ex. 6 | Ex. 7 |
| --- | --- | --- | --- | --- | --- | --- | --- |
| EPT 3070 | 100.000 | 100.000 | 100.000 | 100.000 | 100.000 | 100.000 | 100.000 |
| CB FEF (vol %) | 70.000 | 75.000 | 70.000 | 60.000 | 50.000 | 60.000 | 55.000 |
|  | (20.84%) | (21.51%) | (20.08%) | (18.32%) | (15.76%) | (17.25%) | (17.06%) |
| Process oil (Sunpar 2280) | 5.000 | 005.000 | 005.000 | 005.000 | 005.000 | 005.000 | 005.000 |
| Activator (stearic acid) | 1.000 | 1.000 | 1.000 | 1.000 | 1.000 | 1.000 | 1.000 |
| Accelerator activator (zinc oxide) | 4.000 | 4.000 | 4.000 | 4.000 | 4.000 | 4.000 | 4.000 |
| Co-crosslinking agent (Hi-Cross M) | — | — | 4.000 | — | — | — | 2.000 |
| Crosslinking agent (Percumyl D) | — | — | 3.000 | — | — | — | 2.000 |
| Vulcanizing agent (Seimi OT) | 2.000 | 2.000 | — | 2.000 | 2.000 | 2.000 | — |
| Rubber accelerator (EM-2) | 2.000 | 2.000 | — | 2.000 | 2.000 | 2.000 | — |
| Rubber accelerator (MSA) | 1.000 | 2.000 | — | 2.000 | 2.000 | 2.000 | — |
| Nylon fiber (vol %) | 5.000 | 20.000 | 20.000 | 20.000 | 5.000 | 5.000 | 20.000 |
|  | (2.43%) | (9.36%) | (9.36%) | (9.96%) | (2.57%) | (2.34%) | (10.12%) |
| Cotton | 20.000 | 5.000 | 5.000 | — | 20.000 | 20.000 | 5.000 |
| High-molecular polyethylene (vol %) | — (—) | — (—) | — (—) | — (—) | — (—) | 10.000 (5.94%) | — (—) |
| total | 210.000 | 210.000 | 210.000 | 210.000 | 210.000 | 210.000 | 210.000 |

Figure 3:
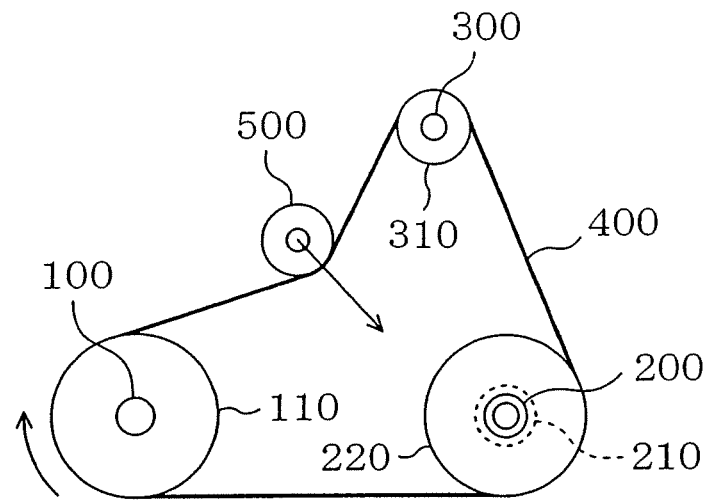
FIG. 3 is a front view schematically showing procedures of a test.

The test was carried out, as schematically shown in FIG. 3, by wrapping each V-ribbed belt 400 around a drive pulley 110 drivingly connected to a drive shaft 100, a first driven pulley 220 connected via a joint 210 to a first load shaft 200 for unitary rotation and a second driven pulley 310 connected to a second load shaft 300 for unitary rotation, driving the drive pulley 110 into rotation at a rotational speed of 3000 rpm while pressing a belt span between the drive pulley 110 and the second driven pulley 310 at a pressing force of 210N with a tension pulley 500 and determining whether or not the joint 210 was broken when the rotation of the first load shaft 200 was locked for five seconds in the above state. Used as the joint 210 was one having a torque limit of 100N·m. Furthermore, seven first driven pulleys 220 having the same material and geometry were prepared for the seven types of V-ribbed belts 400 and were individually exclusive to the associated V-ribbed belts 400. The arc of contact φ of the V-ribbed belt 400 with the first driven pulley 220 was 120°. The pulley diameter φ of the drive pulley 110 was 135 mm, the pulley diameter φ of the first driven pulley 220 was 110 mm and the pulley diameter φ of the second driven pulley 310 was 55 mm.

Figure 4:
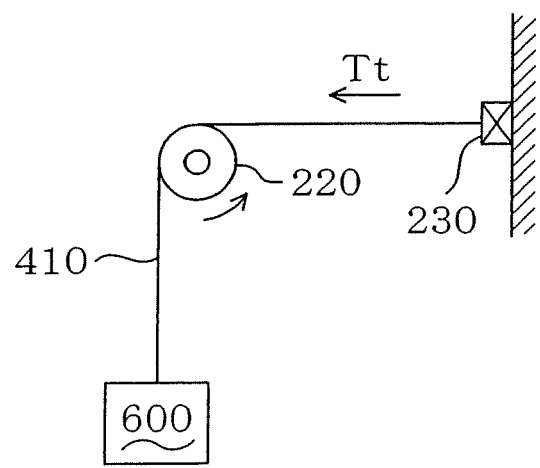
FIG. 4 is a front view schematically showing procedures of a measurement carried out to determine the coefficient of friction between a belt and a pulley.

In addition, for each pair of V-ribbed pulley 400 and first driven pulley 220, the coefficient of friction μ' between them was measured before and after the above test. The measurement was carried out, as schematically shown in FIG. 4, by cutting each V-ribbed belt 400 to a length of 300 mm to prepare a sample 410 having both ends, wrapping the sample 410 around the first driven pulley 220 (with a pulley diameter of 60 mm), connecting a weight 600 (17N) to one end of the sample 410, connecting the other end thereof to a load cell 230 with the sample 410 horizontally extending to form a right-angled arc of contact ($\pi/2$) with the first driven pulley 220, and measuring the tension Tt applied to the load cell 230 while driving the first driven pulley 220 into rotation at a rotational speed of 43 rpm counterclockwise in the figure.

Thereafter, the coefficient of friction μ' between each sample 410 and the first driven pulley 220 was calculated using the following equation for each of before and after the above test. In the following equation, ln denotes the natural logarithm (logarithm to the base e).

$$\mu'=(2/\pi)\times\ln(Tt/17)$$

The test and measurement results are together shown in the following Table 2.

TABLE 2

|  |  | Ex. 1 | Ex. 2 | Ex. 3 | Ex. 4 | Ex. 5 | Ex. 6 | Ex. 7 |
| --- | --- | --- | --- | --- | --- | --- | --- | --- |
| Joint broken? |  | No | No | No | Yes | Yes | Yes | Yes |
| Rubber transferred? |  | No | No | No | Yes | Yes | Yes | Yes |
| Coefficient of friction | Before test | 0.96 | 0.86 | 0.90 | 0.83 | 0.96 | 0.90 | 0.89 |

TABLE 2-continued

|  | Ex. 1 | Ex. 2 | Ex. 3 | Ex. 4 | Ex. 5 | Ex. 6 | Ex. 7 |
|---|---|---|---|---|---|---|---|
| After test | 1.02 | 0.95 | 0.92 | 1.78 | 1.66 | 1.68 | 1.88 |

First, consideration is made of the results of whether or not the joint 210 was broken. For the three types of V-ribbed belts 400 of Examples 1 to 3, their joints 210 were not broken in spite of application of torque over the limit. The visual inspection of the first driven pulleys 220 for the V-ribbed belts 400 of Examples 1 to 3 showed that all of them did not exhibit rubber transfer.

On the other hand, for the four types of V-ribbed belts 400 of Examples 4 to 7, their joints 210 were broken. The visual inspection of the first driven pulleys 220 for the V-ribbed belts 400 of Examples 4 to 7 showed that all of them exhibited rubber transfer. Next, consideration is made of the coefficients of friction $\mu'$ before and after the test. In respect of the coefficients of friction $\mu'$ before the test, those of the V-ribbed belts 400 of Examples 1 to 3 were within the range of 0.86 to 0.96 and those of the V-ribbed belts 400 of Examples 4 to 7 were within the range of 0.83 to 0.96 and substantially the same as the former. Therefore, the reason why the joints 210 for the V-ribbed belts 400 of Examples 1 to 3 were not broken cannot be determined to be that the coefficients of friction $\mu'$ were initially low, and the reason why the joints 210 for the V-ribbed belts 400 of Examples 4 to 7 were broken cannot be determined to be that the coefficients of friction $\mu'$ was initially high.

In respect of the coefficients of friction $\mu'$ after the test, those of the V-ribbed belts 400 of Examples 1 to 3 were within the range of 0.92 to 1.02, while those of the V-ribbed belts 400 of Examples 4 to 7 were within the range of 1.66 to 1.88. Referring to the rate of change in coefficient of friction $\mu'$ between before and after the test, out of Examples 1 to 3, Example 2 exhibited the largest rate of change, approximately 1.105 times ($\approx 0.95/0.86$). On the other hand, out of Examples 4 to 7, Example 5 exhibited the smallest rate of change, approximately 1.729 times ($\approx 1.66/0.96$) and Example 4 exhibited the largest rate of change, approximately 2.145 times ($\approx 1.78/0.83$).

It can be inferred from the above that for each of the V-ribbed belts 400 of Examples 1 to 3, when a torque over the limit was applied to the joint 210 to cause a slip between the V-ribbed belt 400 and the first driven pulley 220, the rubber of the V-ribbed belt 400 did not transfer to the first driven pulley 220, the coefficient of friction $\mu'$ with the first driven pulley 220 therefore did not hardly change, the locking of the first load shaft 200 therefore incurred only the slip of the V-ribbed belt 400 on the first driven pulley 220, the torque applied to the joint 210 was therefore below the limit and the joint 210 therefore were not broken.

On the other hand, for each of the V-ribbed belts 400 of Examples 4 to 7, it can be inferred that when a torque over the limit was applied to the joint 210 to cause a slip between the V-ribbed belt 400 and the first driven pulley 220, part of the rubber material of the V-ribbed belt 400 transferred to the first driven pulley 220, the transferred rubber material caused a large increase in the coefficient of friction $\mu'$ between the V-ribbed belt 400 and the first driven pulley 220, a large slip was therefore caused by the locking of the first load shaft 200 but then reduced to maintain torque input to the first driven pulley 220 and the joint 210 therefore were broken.

Comparison between the rubber materials of the V-ribbed belts 400 of Examples 1 to 3 and the rubber materials of the V-ribbed belts 400 of Examples 4 to 7 shows a difference in the amount of carbon. Specifically, the V-ribbed belts 400 of Examples 1 to 3 contain over 20% carbon, while the V-ribbed belts 400 of Examples 4 to 7 contain not more than 20% carbon (18.32% even in the V-ribbed belt 400 of Example 4 containing the maximum amount of carbon). It can be inferred from this that the wear resistance of each of the V-ribbed belts 400 of Examples 4 to 7 was reduced to a necessary extent.

However, simply reducing the wear resistance is not good enough to transfer rubber to the pulley. In other words, it is necessary that the worn rubber should be less likely to harden. The V-ribbed belts 400 can be believed to satisfy this requirement since they contain high-thermal resistance EPDM as their matrix rubber.

Meanwhile, low wear resistance may incur other problems. Since, however, the V-ribbed belts 400 of Examples 4 to 7 contain a minimum required amount (not less than 10%) of carbon and thermoplastic resin or fibers, typified by aliphatic polyamide, are mixed thereinto, they can be believed to be able to appropriately cope with such problems.

Therefore, according to the belt accessory drive system of this embodiment in which torque from the crank pulley 1 of the engine 11 is transmitted via the V-ribbed belt 20 to the compressor pulley 2, the water pump pulley 3 and the alternator pulley 4 and torque of the compressor pulley 2 is transmitted to the input shaft 12 of the compressor for the air conditioner via the joint 32 capable of breaking itself owing to an overload upon receipt of it and thereby stopping the torque transmission, when a slip corresponding to an overload of the joint 32 occurs between the V-ribbed belt 20 and the compressor pulley 2 in the belt accessory drive system, the coefficient of friction $\mu'$ between them becomes high, which ensures the breakage of the joint 32 without previously unnecessarily increasing the coefficient of friction $\mu'$ or the belt tension. As a result, production of abnormal sound due to excessively high coefficient of friction $\mu'$ and increase in transmission loss due to excessively high belt tension can be prevented while torque transmission to the water pump pulley 3 and the alternator pulley 4 can be maintained even at the malfunction of the compressor.

Although in the above embodiment the joint 32 is attached to the compressor for the air conditioner, it may be attached to another or all of the engine accessories driven by the belt drive.

Furthermore, although the above embodiment describes the case where the V-ribbed belt 20 is used as a drive belt, any other type of frictional drive belt can be used as a drive belt.

Furthermore, although the above embodiment describes the belt engine accessory drive system, it is needless to say that the present invention is applicable to any other type of belt drive system.

The invention claimed is:

1. A belt drive system comprising:
a drive source for generating torque;
a drive pulley, drivingly connected to the drive source, for outputting the torque of the drive source;
at least one driven unit for performing a specified action upon input of the torque;
a driven pulley, connected to the driven unit, for inputting the torque to the driven unit;
a joint, interposed between the driven pulley and the driven unit to transmit the torque of the driven pulley to the driven unit, for stopping the torque transmission when receiving a load equal to or over a predetermined value, and wherein a belt contact surface of the driven pulley is covered with rubber that has been transferred to the driven pulley from the drive belt as a result of slippage between the drive belt and the driven pulley occurring from an increase in the input of torque required to drive the driven unit such that a coefficient of friction between the drive belt and the driven pulley increases due to a transfer of material from said contact surface of the drive belt to the driven pulley, thereby applying a load on the joint equal to or over the predetermined value necessary to stop the transmission of torque to the driven unit, and wherein the rubber is ethylene propylene diene terpolymer, and the rubber contains 10 to 20 vol % carbon.

2. A belt drive system comprising:

a drive source for generating torque;

a drive pulley, drivingly connected to the drive source, for outputting the torque of the drive source;

at least one driven unit for performing a specified action upon input of the torque;

a driven pulley, connected to the driven unit, for inputting the torque to the driven unit;

a joint, interposed between the driven pulley and the driven unit to transmit the torque of the driven pulley to the driven unit, for stopping the torque transmission when receiving a load equal to or over a predetermined value, and wherein a belt contact surface of the driven pulley is covered with rubber that has been transferred to the driven pulley from the drive belt as a result of slippage between the drive belt and the driven pulley occurring from an increase in the input of torque required to drive the driven unit such that a coefficient of friction between the drive belt and the driven pulley increases due to a transfer of material from said contact surface of the drive belt to the driven pulley, thereby applying a load on the joint equal to or over the predetermined value necessary to stop the transmission of torque to the driven unit, and wherein the rubber is alkylated chlorosulfonated polyethylene rubber, and the rubber contains 10 to 20 vol % carbon.

3. The belt drive system of claim 1 or 2, wherein the rubber contains 6 or more vol % aliphatic polyamide fibers.

4. The belt drive system of claim 1 or 2, wherein the drive source is an engine for a motor vehicle, and the driven unit is an accessory of the engine.

5. The belt drive system of claim 2, wherein the rubber contains 6 or more vol % aliphatic polyamide fibers.

\* \* \* \* \*